May 13, 1941.   B. CAMPBELL   2,241,375
METHOD FOR DRYING
Filed Sept. 19, 1938

INVENTOR.
Bowen Campbell
BY Bair & Freeman
ATTORNEYS

Patented May 13, 1941

2,241,375

UNITED STATES PATENT OFFICE 2,241,375

METHOD FOR DRYING

Bowen Campbell, Des Moines, Iowa

Application September 19, 1938, Serial No. 230,646

6 Claims. (Cl. 34—34)

My invention relates to a method for drying vegetable materials, and particularly one adapted to a slow drying process by means of which surface moisture may be initially removed and thereafter moisture removed from the interior of the grain or vegetable.

Among the objects of my invention is the provision of a new and improved method and means for slowly drying vegetable materials, which is simple and economical to operate.

Another object is the provision of a new and improved method and means for continuously drying quantities of vegetable materials and particularly grains which need a slow drying process in order to properly preserve the inherent characteristics of the material.

Another object still is a new and improved method whereby grains which are to be used for seed purposes may be dried by a continuous process which is directed first to the removal of surface moisture and subsequently to the removal of internal moisture.

A further object is a provision of a method for continuously drying grains such as seed corn on the ear if need be, which is directed to passing the hottest and driest air at a relatively slow velocity first over a quantity of grain such as corn which has already been partially dried or deprived of the surface moisture and then passing the same air at a relatively higher velocity over a quantity of grain or corn for the purpose of removing the surface moisture and then exhausting the substantially saturated air.

A further object is to utilize such a drying process so that it may be used with a portable heater and blower in such a manner that bins may be erected in localities most convenient to the source of production of the corn or grain and a single mechanical apparatus comprising a heater and blower transported from one to another whenever it is necessary to employ the drying process.

Figure 1:
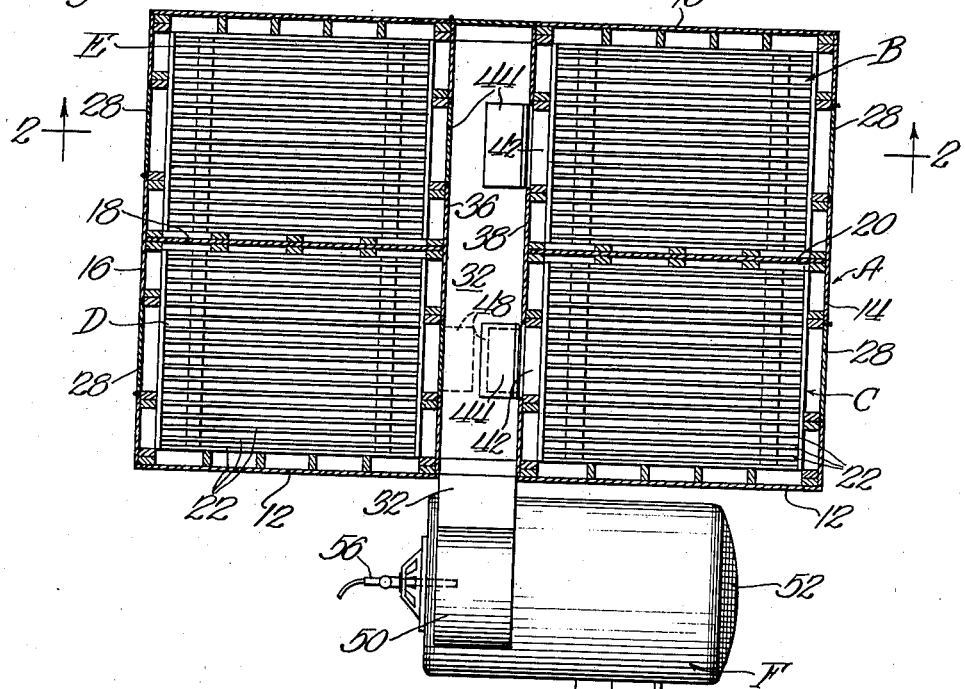
Figure 2:
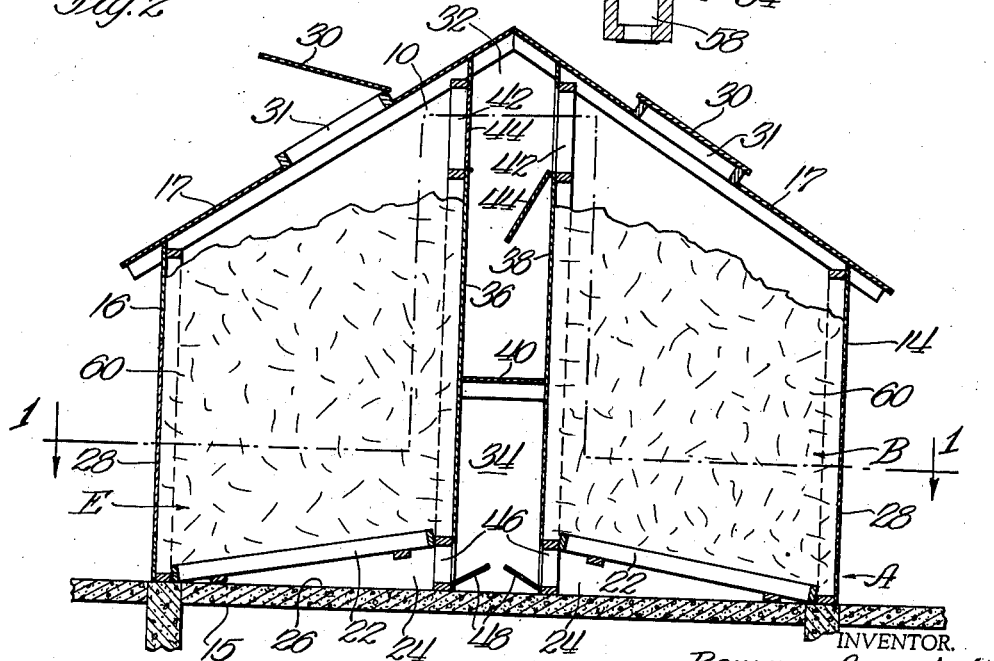

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a plan view of an apparatus partly in section suitable for the operation of my method taken on the line 1—1 of Figure 2, and Figure 2 is a vertical elevation of the apparatus taken on the line 2—2 of Figure 1.

In the drying of vegetable matter and particularly grains which are to be used for seeding purposes it is necessary that the vegetable matter be dried slowly, uniformly, and carefully in order that the inherent qualities are not destroyed but only rendered inert until such later time as they may be needed. In drying processes of this sort the vegetable matter to be dried, such as corn or grain, is frequently moist upon the surface and before any permanent drying is done it is necessary first to remove the surface moisture, which can be done safely at a relatively rapid rate. After the surface moisture has been removed, the subsequent removal of moisture within the grain must take place at a relatively slower rate so as not to destroy such characteristics as the germinating substances within the grain. It is true, moreover, that when once the surface moisture has been removed from a grain, such as corn, and the kernels partly dried, the drying process may be continued at a temperature considerably hotter than that used in initially removing the surface moisture without fear of damage to its germination. For this reason, a multiple-stage process lends itself very readily to the production of properly dried grains.

In contemplating the production of a method suitable for this purpose it is likewise desirable to have a method which is continuous. Although continuous methods of drying are comparatively old these methods in general can be employed only by the installation of more or less complicated machinery or in commercial plants where only the most modern conveniences can be employed.

In the present invention a continuous process is disclosed which is extremely simple and can be employed with a minimum of expense almost anywhere on a farm which is convenient to the fields where the grain is grown. The process and the apparatus by means of which it is performed is of an extremely simple character easily understood by the average farmer and readily available to even very small farms where relatively little capital is available.

While a considerable number of bins may be utilized in practicing the invention, an arrangement of four only has been elected to simplify the description.

The apparatus disclosed therefor illustrating the operation of my device comprises in general a well-constructed shed, indicated by the character A, divided into four bins, indicated by the characters B, C, D and E, respectively. These bins are adapted to be filled with grain such as corn, on the ear if desired, and to have the grain or corn dried while in the bins. For drying purposes, there is supplied a portable unit F consisting of a heating unit and a blower for forcing hot dry air into the bins.

The shed itself may be of either wood or metal construction, having outer end walls 10 and 12, and outer side walls 14 and 16, a bottom 15 and a roof 17. The shed illustrated in the drawing is divided into four sections, two on the left separated by the partition wall 18 and two on the right separated by the partition wall 20.

At the bottom of each bin there is provided a perforated false bottom 22 which may be made of a lattice of slats running crosswise of the bin and pitched toward the outside. By providing a false bottom of this sort there is formed an open space 24 between the false bottom and the upper surface 26 of the bottom 15.

Air-tight doors 28 are provided at the sides of the bins for unloading the contents and at the top there is provided also an air-tight trap door 30 for each bin through which the bin may be loaded, but which also serves as an exhaust for the air used in drying.

Through the center of the shed there is provided an upper conduit 32 and a lower conduit 34, the sides of both conduits being formed by the partitions 36 and 38, which also form the inner walls of the respective bins B, C, D, and E. Conduits 32 and 34 are separated from each other by a horizontal central partition 40 which forms the bottom of conduit 32 and the top of conduit 34. Each bin is provided with a connecting passage 42 at the top having a door 44 which opens into the conduit 32. At the bottom each bin is likewise provided with connecting passages 46, having doors 48, opening into the lower conduit 34. The lower conduit 34 is used only to interconnect one bin with another but the upper conduit 32 is connected to the combined heater and blower and is used to conduct dry heated air from the blower to the shed.

Outside the shed the combined heater and blower F is positioned so that the exit portion 50 of the blower is connected with the conduit 32. Although a portable heater and blower is shown, it is of course presumed that when conditions warrant a stationary heater and blower may be installed. The blower is provided with a screen 52 through which outside air is drawn and a shaft 54 which can be attached to a tractor or gas engine for driving the blower. Adjacent the floor is provided a heating unit fired in any conventional manner, as, for example, by the gas or oil supply line 56, and provided with a stack 58 for conducting away the combustion gases, although in some instances it may be possible to use the hot combustion gases mixed with the air and send the mixture through the drier.

It is furthermore contemplated that the direction of hot air flow may be varied somewhat to suit different conditions. In the device here shown the direction may be reversed so that flow is from top to bottom, or by some changes apparent to those skilled in the art, the flow may even be directed horizontally.

*Operation*

In the operation of the disclosed embodiment of my invention the bins are filled with approximately equal quantities 60 of corn on the ear. Some of the corn can be placed by being carried through the door 28 and when filled above a certain height the remainder of the corn can be inserted through an opening 31 normally closed by the trap door 30. Ordinarily only three of the bins are being subjected to a drying process at the same time, which allows time for emptying and refilling the fourth bin. In starting operation, however, the corn in two of the bins must be preliminarily dried to such an extent that all or practically all of the surface moisture is removed. This is done with dry air at a relatively low temperature in order that no damage may be done to the corn.

To trace through a drying process, let us assume that the corn in bins B and C have first been initially dried by air blown from the blower through the conduit 32 at a relatively low temperature which can be controlled by properly adjusting the fuel supply. During the initial drying period the air from the conduit 32 enters bins B and C through the upper connecting passages 42 and is then forced downward over the body of corn from whence it emerges within the space 24 at the bottom. Air from this space then passes through the open lower connecting passages 46 into the conduit 34 and thence through the connecting passages 46 of the bin D, for example, and upward through the corn in bin D to the top from whence it is exhausted through the opening 31 in the roof.

Once the corn in bins B and C has been initially dried the temperature of the drying air is raised to approximately 110 degrees. The air continues to follow the same course as previously outlined. Air now at the higher temperature serves to extract internal moisture from the corn in bins B and C, and by reason of the fact that the cross sectional area of bins B and C is relatively large, the quantity of air entering their respective connecting passages 42 is spread over this considerable area resulting in a considerable reduction of the velocity of movement of the air downward through the bins B and C, thereby giving ample time to thoroughly dry the corn in these bins.

Air emerging from both bins B and C is accordingly partially saturated and cooled by passage over the corn and is expelled from bins B and C into the conduit 34 through the lower connecting passages 46 of these respective bins.

Let us assume that the corn in bin B is to be dried first. This being the case, the lower connecting passage 46 of the bins B, C and D will be opened by dropping their respective doors 48, but the similar passage 46 of the bin E will be closed. Therefore, all of the air emerging from the bins B and C will be forced into the single bin D. This will result in a speeding up of the velocity of air passing upward through the bin D and the more rapid flow of air at a cooler temperature will be effective in drying the surface moisture completely from the corn in bin D. The air, practically saturated at this stage with moisture from the surface of the grain, is exhausted through the opening 31 in the roof.

As soon as the corn in bin B has been dried the process is discontinued through bin B by closing the doors 44 and 48 of the passages 42 and 46 respectively. At this point in the operation the passage 42 of bin D is opened and likewise passage 46 only of bin E. At the same time the trap door 30 of bin D is closed and the trap door 30 of bin E is opened. The hot dry air now passes into bins C and D at the top, passes downward through them and outward at the bottom into the conduit 34 from which it is conducted into the bottom of bin E. The passage of air is then upwards through the bin E and outward through the open trap door in the roof. After a period of time approximately equal to one-third of the total drying time the bin C is closed off in the same manner as was bin D, bin B in the meantime having been emptied of the dry corn and refilled with undried corn.

Then the passages 42 of bins E and D are opened so that hot dry air from the conduit 32 can enter the tops of these bins and be conducted downward through the bins and outward at the bottoms into the conduit 34. Meanwhile the lower passage 46 of the bin B, having been opened, the partly saturated air from bins E and D is conducted from the bottom of bin B upward through the undried corn and outward through an open trap door 30 at the top.

Each period of drying continues for about one-third of the total drying time for a single bin so that during the process, once it has been fully started, the corn in each of the three bins is dried during a full period. During the progressive drying of corn in three bins there is always a fourth bin closed off in order that its dried contents may be removed and replaced with undried corn.

By carrying out the process as disclosed it is apparent that there has been provided a continuous method for drying corn by subjecting it to successive different drying conditions, that is to say, using a high velocity of relatively cool air for the initial drying and a slow velocity of relatively hot air for the final drying. The process can be continued until the available stock of corn is completely processed and then the portable blower and heater removed and transported to another locality and there attached to a shed of similar construction where the drying process may be recommenced.

It is to be further noted that although the disclosure herein presented is directed to a continuous drier, a similar method can be employed acting as a batch drier, should this type of drying fit a particular circumstance. For such a method an apparatus can be used similar to the one described. In operation a pair of bins, B and C for example, can be preliminarily dried, then 110° dry air can be passed downward over the grain in B and C and led out at the bottom first into the bin D for half of the period and then into bin E for the remaining half of the period, until the grain in bins B and C has been dried. Then the dry grain in the last named bin may be replaced with undried grain and the direction of air reversed so as to pass downward over the grain in bins D and E already partly dried, and upward through the fresh grain in bins B and C. In this manner both dry heated air and the same air partially saturated and cooled is utilized before being exhausted thereby making the process practical and economical as well as being best adapted to drying seed grain.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. A continuous method of drying vegetable material by use of a volume of dry heated air comprising segregating the material into three lots of substantially equal quantities, passing the dry heated air initially through two of said lots of partially dried material at a relatively slow velocity so that the hottest air extracts the internal moisture and then passing the partially moistened air through the remaining third lot at relatively higher velocity so that the partially cooled and moistened air may extract the surface moisture from the third lot.

2. A continuous method of drying vegetable material by use of a constant volume of heated air supplied at a predetermined velocity comprising segregating the material into three lots of substantially equal quantities and areas, preliminarily drying the surface moisture from the material in two of the lots, passing the constant volume of heated air downward through the partially dried material in said two lots so that substantially one-half will pass through each lot at a corresponding velocity, enabling it to draw the internal moisture from the material, then passing said constant volume of air from both said first two lots, now partially saturated, upwards through a third lot of undried material at a corresponding increase in velocity with respect to its velocity through said first two lots for drying the surface moisture from material in the last named lot and then exhausting the saturated air from the last lot.

3. A continuous method of drying grain by use of a volume of dry heated air comprising segregating the grain into three lots of substantially equal quantities, passing the dry heated air initially downward through two of said lots of partially dried grain at a relatively slow velocity so that the hottest air extracts the internal moisture and then passing the partially moistened air upward through the remaining third lot at relatively higher velocity so that the partially cooled and moistened air may extract the surface moisture from the third lot.

4. A continuous method of drying grain by use of a volume of dry heated air comprising segregating the grain into lots of substantially equal quantities, preliminarily drying the surface moisture from two of the lots, passing the dry air through said two lots for a third of a period of time necessary to completely dry one said lot at relatively low velocity to extract the internal moisture at a relatively slow rate, passing the air therefrom through a third lot of undried grain to an exhaust at a relatively higher velocity to extract the surface moisture therefrom, then passing dry air simultaneously through one of the said first two lots and said third lot for a third of said period of time meanwhile passing the air therefrom through still a fourth lot to an exhaust to remove the surface moisture and then passing dry air simultaneously through said third and fourth lots before passing the air therefrom through still a fifth lot for a third of said period of time, whereby once the process is started each lot in its turn is given a full period of drying time.

5. A continuous method of drying grain by use of a constant volume of dry heated air comprising segregating the grain into lots of substantially equal quantities and areas, preliminarily drying the surface moisture from two of the lots, passing the dry air downward through said two lots for a third of a period of time necessary to completely dry one lot at relatively low velocity to extract the internal moisture at a relatively slow rate, passing the air therefrom upward through a third lot of undried grain to an exhaust, at a relatively higher velocity to extract the surface moisture therefrom, then passing air downward through one of said first lots and said third lot for a third of said period of time meanwhile passing the air therefrom upward through still a fourth lot to an exhaust to remove the surface moisture and then passing the air downward through said third and fourth lots before passing the air upward through still a fifth lot for a third of said period of time, whereby once the process is started each lot is given in its turn three successive periods of one-third of said drying time.

6. A continuous method of drying vegetable material by use of a constant volume of dry heated air supplied at a substantially fixed velocity comprising segregating the material into lots of substantially equal quantities, preliminarily drying the surface moisture from material in two of the lots, passing one-half of the volume of heated air for a period of time through each of said two lots of partially dried material to reduce the air velocity and draw internal moisture from the material at a relatively slow rate and simultaneously passing all air from both said lots through one lot of undried material to an exhaust for the first part of the period thereby relatively increasing the air velocity through said one lot for drying surface moisture from said one lot and then similarly passing said air through another lot of undried material during another part of the period so that two lots thereof will be partially dried and two lots completely dried.

BOWEN CAMPBELL.